United States Patent Office 3,509,028
Patented Apr. 28, 1970

3,509,028
DRYING p-CRESOL BY DISTILLATION
WITH TOLUENE
William Budd, Cuyahoga Falls, and Albert H. Olzinger, Akron, Ohio, assignors to The Goodyear Tire & Rubber Company, Akron, Ohio, a corporation of Ohio
No Drawing. Filed June 29, 1967, Ser. No. 649,806
Int. Cl. B01d 3/36; C07c 37/38
U.S. Cl. 203—14                               5 Claims

ABSTRACT OF THE DISCLOSURE

A process for reducing the water content of phenols to low levels comprising the use of a drying agent and distillation techniques.

---

This invention relates to a process of drying a phenol. More specifically, it relates to the drying of a phenol with a drying agent using distillation techniques.

It has long been desired to reduce the moisture level of organic materials, which possess an affinity for water, to an extremely low level. It is well known that the presence of water is often times detrimental to chemical reactions. Various reaction catalysts are inactivated or substantially inactivated by the presence of water. As a result low rates of reaction, low yields and low purity due to the formation of undesirable side products are obtained. In such systems, therefore, it is prerequisite to satisfactory performance that the moisture content of the reaction system be kept to a minimum. Such systems sometimes require that the reaction take place under an atmosphere having a very low water content. Still another requirement in such systems may be that the reactants and solvents themselves possess a very low water content. Commercial materials which contain water, when used as reactants insuch systems, must therefore sometimes be dried prior to charging to the reaction zone. It is also sometimes economically necessary to recycle unreacted materials containing water. Condensation reactions involve the formation of water as a side product of the reaction. In these systems where water is a side product of the reaction, and where the unreacted materials have an affinity for water and must be recycled to be economical, it is necessary to dry the recycled reactant before returning it to the reaction zone.

An ideal drying process should be simple, practical, inexpensive and incapable of altering the composition of the material to be dried. Its performance should not be limited by the water content of the material to be dried nor by the presence of foreign materials. Ideally the drying time should not be unduly lengthened because of the water content of the material to be dried.

Previous attempts to dry phenols to a very low water content have been deficient in one or more of the aforementioned requirements for an ideal drying process. There are three common methods used in drying organic materials to a very low water content. They involve straight distillation, azotropic distillation, and molecular sieves or a combination of these methods. Under the straight and azeotropic distillation techniques, there is a loss of some of the material being dried, particularly in the former, and especially if the water is very soluble in the material to be dried. In addition, where the moisture content of the material to be dried is very high and the desired moisture content very low, the equipment necessary to effect such drying may be highly impractical due to its size, complexity and expense. Molecular sieves are limited in their capacity to remove water and must be regenerated a number of times if a large amount of water must be removed. For example, materials containing huge quantities of water (for example, 100 thousand parts per million) require large amounts of molecular sieves, or in the alternative, frequent regeneration or removal and replacement of the molecular sieves during the drying process. This method can therefore be very expensive, impractical and time consuming.

It is an object of this invention to provide a method of removing water from a phenol so as to provide an extremely dry phenol. It is a further object of this invention to provide a more facile, efficient and economical method for removing water from a phenol by continuously introducing a drying agent into the phenol and continuously removing both drying agent and the water from the phenol, resulting in the production of a phenol substantially free of water.

In accordance with the present invention it has been discovered that phenols may be dried, i.e., water associated with the phenol may be removed, practically, simply an inexpnesively to an extremely low moisture content by subjecting a mixture of phenol, water and a drying agent to distillation for a time sufficient to reduce the amount of water associated with the phenol to a concentration below about 700 parts per million parts of phenol. The phenol may be a mixture of phenols, and the drying agent may be a mixture of drying agents.

The phenols may be dried in a batchwise fashion, i.e., by mixing the entire amount of the phenol to be dried with the entire amount of drying agent to be used prior to the commencement of distillation. The phenols may also be dried by a continuous process where the drying agent is continuously added to the phenol and continuously removed along with the water from the mixture of the phenol, water and drying agent during the distillation. Similarly both the phenol and the drying agent may be added simultaneously and continuously and the drying agent distilled from the mixture along with the water. The basic concept of this invention may also be carried out by other procedures obvious to those skilled in the art.

A preferred method of carrying out the process of the present invention involves continuously adding the drying agent to a phenol/drying agent mixture and continuously removing drying agent and water by distillation from the mixture. The most preferred method involves continuously adding both the drying agent and the wet phenol to the phenol/drying agent mixture and continuously removing drying agent and water by distillation from the mixture.

In one embodiment of the present invention the drying agent is added continuously to the wet phenol in a drying pot and the drying agent and water continuously removed from the mixture of phenol, water and the drying agent. Because of vapor pressure relationships some of the phenol will distill along with the drying agent and the water. The distillate is then condensed and the majority of the water separated from both the drying agent and the phenol by decantation. The drying agent and phenol mixture still having some water associated therewith is then passed into a distillation column to reduce the water content of the mixture. The drying agent/phenol mixture is then returned to the original wet phenol/drying agent mixture to complete the cycle.

In another embodiment of the present invention a continuous process is used wherein essentially the same procedure is followed as described above except that the distillation column for the distilled phenol/water/drying agent mixture is made a part of the drying apparatus. By attaching the column to the drying pot and adding the wet phenol and drying agent to the column at a point partway between the drying pot and the top of the column the column performs the double function of both drying the drying agent and drying the phenol through the use of this drying agent. The distillate is condensed and the water separated from the phenol/drying agent combination by decantation. The combination is then returned to the feed point of the column to complete the cycle.

The drying techniques according to the present invention are useful in drying any phenol in liquid form. By any phenol is meant any aromatic organic compound in which one or more hydroxy groups are attached nuclearly to the aromatic structure, such as unsubstituted phenol, substituted phenols and unsubstituted and substituted naphthols.

Examples of such materials are as follows: Phenol, cresol (ortho, meta, or para), halophenol (ortho, meta or para), bromophenols, nitrophenols, aminophenols, catechol, resorcinol, hydroquinone, thymol, eugenol, naphthols, xylenols, pyrogallol.

The invention is particularly applicable to materials conforming to the following structural formula:

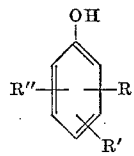

wherein R, R' and R" are selected from the group consisting of hydrogen, alkyl radicals containing from 1 to 6 carbon atoms and aralkyl radicals containing from 6 to 8 carbon atoms.

Examples of materials conforming to this structural formula are: Phenol, o-cresol, m-cresol, p-cresol, 2,6-dimethyl phenol, 2-t-butyl-4-methyl phenol, 2,6-di-α-phenethyl phenol, 2,6-di-α-phenethyl-p-cresol.

The process of this invention is particularly efficient where phenol, cresols and xylenols are being dried and most particularly where p-cresol is being dried.

Any liquid or gaseous drying agent, i.e., a compound capable of interacting with water, which is unreactive with the phenol to be dried may be used. It is desirable that the water content of the drying agent be less than that of the phenol since this difference acts as a driving force to facilitate the removal of the water from the phenol and interaction of the water with the drying agent. It is necessary that the boiling point of the drying agent be lower than that of the phenol. It is also preferable that the drying agent and phenol be soluble in one another. Such materials include substituted and unsubstituted benzene and substituted and unsubstituted naphthene.

Specific examples of drying agents that may be used in the practice of the present invention are: chloroform, ether, n-hexene, n-butyl alcohol, ethyl benzene, 2-methyl-butanol-2, tetrachloromethane, chlorobenzene, chlorobuta-1,3-diene, chloroform, cyclohexene, n-dipropyl ether, i-dipropyl ether, ethylene chlorobromide, methyl butyrate, n-propyl acetate, i-propyl bromide, trichloroethylene.

Preferred drying agents are those possessing the following structural formulae:

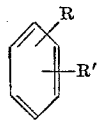

wherein R and R' are selected from the group consisting of hydrogen and alkyl radicals containing from 1 to 6 carbon atoms; and

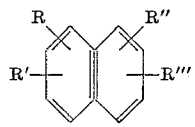

wherein R, R', R" and R''' are selected from the group consisting of hydrogen and alkyl radicals containing from 1 to 6 carbon atoms.

Examples of materials conforming to the above structural formulae are: benzene, toluene, o-xylene, m-xylene, p-xylene, p-ethyl toluene, o-butyl toluene, 2-hexyl, ethyl benzene, 3-heptyl, propyl benzene, 4-t-butyl, propyl benzene, naphthalene, 1-methyl naphthalene, 3-ethyl naphthalene, 1-ethyl, 6-butyl naphthalene, 2-hexyl, 5-propyl naphthalene, 4-amyl, 8-methyl naphthalene, 3,7-dibutyl naphthalene, 3-t-butyl naphthalene.

The most preferred drying agents are benzene, toluene and the xylenes and in particular toluene.

The lower the boiling point of the drying agent, the more efficient is the operation of the drying process. Although not necessary for the satisfactory performance of the invention, it is preferable that the solubility of the drying agent in water and the solubility of water in the drying agent should be low. This is desirable from a practical standpoint in that the drying agent and water can be easily separated by a decantation process if they are not mutually soluble in one another and the separated drying agent can then be dried and recycled to the drying zone. Again, although not necessary to the operation of the invention, it is desirable to charge the drying agent to the phenol at a temperature which is at the boiling point of the drying agent. This is desirable from the standpoint that the heat input into the drying unit in order to distill off the drying agent and the water is reduced. It is particularly desirable where the phenol and the drying agent are added as part of a completely continuous process as earlier described since less equipment is necessary. The operational temperature varies depending upon the components and the pressures used. As anyone familiar with pressure/temperature relationships realizes, various combination of pressure and temperature may be used to obtain essentially the same results, in particular, the distilling out of the drying agent and water may be realized at various pressures and temperatures. The drying system can be operated at above or below atmospheric pressure. Depending on the components, it may be desirable to operate at particular pressures. It is desirable, for example, to operate under a vacuum where the decomposition temperature of the phenol or the drying agent is relatively low. The drying time is dependent on the ratio of the amount of the drying agent used to the amount of the phenol to be dried and the water content of the drying agent. Where the drying agent is added continuously to the phenol, the drying time is partially dependent on the ratio of the rate of flow of the drying agent used to the amount of phenol.

The following examples illustrate the operation of the drying process in accordance with the present invention but they are not to be interpreted as limitations of the scope of the invention.

EXAMPLE 1

To a drying pot were added 6420 grams of p-cresol and 210 grams of water. The pot temperature was raised to 150° C. Relatively dry toluene was then continuously fed at the rate of 124.5 grams per minute into the pot and continuously distilled at 150° C. from the pot along with the water from the p-cresol. Due to vapor pressure relationships some p-cresol distilled. Samples were taken intermittently from the pot mixture during the distillation. The samples were stripped of the toluene and a Karl Fischer titration was run on the p-cresol to determine its water content. The water contents are listed in Table I.

The distilled toluene, p-cresol and water were condensed and the water separated from the toluene/p-cresol combination in a decanter. The toluene was then fed into a distillation column to lower the water content of the toluene. The dry toluene was then fed back into the drying pot containing the original mixture to complete the cycle and continue the drying process. The following conditions remained essentially constant during the distillation:

Pot temperature—150° C.
Pot and column pressure—atmospheric
Temperature of toluene entering the drying pot—109° C.
Decanter temperature—32° C.

About the time that the concentration of water in the p-cresol reached 900 parts per million, the overhead temperature of the distillate leveled out at about 110° C. where it remained until the distillation was complete.

| Sample No. | Time (min.) | P.p.m. water in p-cresol | P.p.m. water in toluene being charged |
|---|---|---|---|
| 1 | 0 |  | 37.4 |
| 2 | 5 | 878 |  |
| 3 | 10 | 781 |  |
| 4 | 15 | 370 |  |
| 5 | 25 | 310 |  |
| 6 | 35 | 290 |  |
| 7 | 45 | 241 |  |
| 8 | 60 |  | 32.6 |
| 9 | 75 | 199 |  |
| 10 | 90 | 181 |  |
| 11 | 120 | 163 | 33.6 |

EXAMPLE 2

To the drying pot were added 6800 grams of p-cresol and 250 grams of water. The pot temperature was raised to 110° C. a vacuum was placed on the pot and the temperature raised to 118° C. Relatively dry toluene was continuously fed into the pot at a rate of 124 milliliters per minute during distillation of the toluene, the water and some p-cresol from the pot. Samples were intermittently taken from the pot and stripped of toluene. The stripped p-cresol was then tested for water content using the Karl Fischer titration. The following reaction conditions remained constant during the distillation.

Pot temperature—128–132° C.
Pot pressure—460 mm. of Hg abs.
Column pressure-atmospheric—740 mm. of Hg abs.
Temperature of toluene entering the drying pot—109° C.
Decanter temperature—32° C.

| Sample No. | Time (min.) | P.p.m. water in p-cresol | P.p.m. water in toluene being charged |
|---|---|---|---|
| 1 | 0 |  | 85 |
| 2 | 5 | 692 |  |
| 3 | 10 | 425 |  |
| 4 | 15 |  |  |
| 5 | 25 | 443 |  |
| 6 | 35 | 321 |  |
| 7 | 45 | 283 |  |
| 8 | 60 | 225 |  |
| 9 | 75 | 226 |  |
| 10 | 90 | 227 |  |
| 11 | 120 | 220 | 84 |

It will be noted from the above data that the p-cresol was very effectively dried at both atmospheric pressure and under a vacuum to a very low water level.

The following examples illustrate the batchwise drying of various phenols with various drying agents at atmospheric pressure. In each example the phenol and drying agent were added along with water to a 500 milliliter round bottom flask. The batches were heated until the overhead temperature was at least 5° C. in excess of the boiling point of the drying agent used. The water levels in the stripped phenol were determined by a Karl Fischer titration after the drying was completed.

EXAMPLE 3

| Batch charge | Grams | P.p.m. water in stripped pot mixture | |
|---|---|---|---|
|  |  | Before drying | After drying |
| p-Cresol | 2,067 | 10,600 | 179 |
| Toluene | 207 | 351 |  |
| Water | 20.7 |  |  |

EXAMPLE 4

| p-Cresol | 2,070 | 10,900 | 414 |
|---|---|---|---|
| Benzene | 207 | 640 |  |
| Water | 20.7 |  |  |

EXAMPLE 5

| p-Cresol | 2,070 | 10,700 | 145 |
|---|---|---|---|
| Xylene | 207 | 219 |  |
| Water | 20.7 |  |  |

EXAMPLE 6

| Phenol | 1,870 | 10,400 | 43 |
|---|---|---|---|
| Toluene | 187 | 392 |  |
| Water | 18.7 |  |  |

EXAMPLE 7

| Phenol | 1,845 | 10,500 | 724 |
|---|---|---|---|
| Benzene | 187 | 490 |  |
| Water | 18.7 |  |  |

Thus, a more facile, efficient and economical process has been provided as a means of reducing the level of water in phenols to as low as 300 parts per million and below.

Although the conditions for the process of this invention can be varied as known to one skilled in the art to obtain the desired results, and although the conditions to be chosen are dependent on such variables as the phenol to be dried, the water content of the phenol, the drying agent to be used, the rate of addition of the drying agent, the boiling point of the phenol, the boiling point of the drying agent, etc., the following conditions are preferred.

Rate of addition of drying agent: about 100 to about 150 parts per minute based on about 3,000 to about 10,000 parts of phenol Distillation time: about 5 minutes to about 3 hours Distillation temperature of the pot mixture: about 125° C. to about 155° C.

Original water content of phenol: less than 35,000 p.p.m.

While certain representative embodiments and details have been shown for the purpose of illustrating the invention, it will be apparent to those skilled in this art that various changes and modifications may be made therein without departing from the spirit or scope of the invention.

What is claimed is:

1. A process for removing water associated with a phenol comprising (a) continuously adding a relatively water free drying agent to a mixture of a phenol, water and a drying agent; (b) continuously subjecting the mixture to distillation to reduce the amount of water associated with the phenol; (c) condensing the distillate; (d) separating the water from the drying agent; and (e) repeating steps (a) through (d) until a water concentration below about 700 parts per million parts of phenol is attained, said phenol being p-cresol and said drying agent being toluene.

2. The method of claim 1 wherein the toluene is added at the rate of from about 100 to about 150 parts per minute based on about 3,000 to about 10,000 parts of phenol.

3. The method of claim 2 wherein the distillation temperature ranges from about 125° C. to about 155° C.

4. The method of claim 3 wherein the distillation is continued for about 5 minutes to about 3 hours.

5. The method of claim 4 wherein the p-cresol originally contains less than 35,000 p.p.m. of water.

(References on following page)

References Cited

UNITED STATES PATENTS

| | | | |
|---|---|---|---|
| 2,048,178 | 7/1936 | Carney | 203—18 X |
| 2,286,056 | 6/1942 | Brown | 203—69 X |
| 2,537,115 | 1/1951 | Scheibel | 203—62 |
| 2,573,244 | 10/1951 | Bogart et al. | 203—18 |
| 2,652,439 | 9/1953 | Neuhart et al. | 203—68 X |
| 2,762,760 | 9/1956 | Walker | 203—69 X |
| 2,831,869 | 4/1958 | Kohn | 203—69 X |
| 2,322,881 | 6/1943 | Pollock. | |
| 3,293,154 | 12/1966 | Newton | 203—18 |

FOREIGN PATENTS

| | | |
|---|---|---|
| 762,974 | 12/1956 | Great Britain. |
| 118,637 | 7/1930 | Germany. |
| 640,178 | 7/1950 | Great Britian. |

NORMAN YUDKOFF, Primary Examiner

F. E. DRUMMOND, Assistant Examiner

U.S. Cl. X.R.

203—18, 69; 260—621